Figure 1:
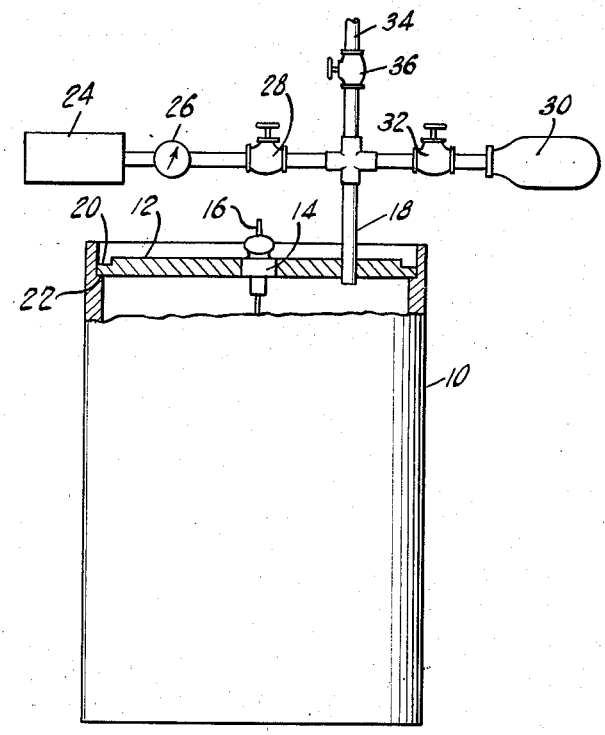

July 22, 1958 — R. P. MAZZAGATTI — 2,844,707

MANUFACTURE OF RADIATION DETECTORS AND THE LIKE

Filed June 24, 1954

United States Patent Office 2,844,707
Patented July 22, 1958

2,844,707

MANUFACTURE OF RADIATION DETECTORS AND THE LIKE

Roy P. Mazzagatti, Bellaire, Tex., assignor to The Texas Company, New York, N. Y., a corporation of Delaware Application June 24, 1954, Serial No. 439,084

5 Claims. (Cl. 219—74)

This invention relates to a method of constructing detectors of penetrative radiation, particularly to detectors of the gas amplification, electrical pulse producing type for detecting gamma rays. The principal object of the invention is the provision of a method whereby the housing of a detector of this type can be closed and sealed while preventing any oxidation taking place in the interior of the detector housing.

It is well known to those generally familiar with this art that a radiation detector of the gas amplification, electrical pulse producing or counter type usually comprises a cathode and an anode electrode disposed within a sealed housing containing an ionizable gas filling. Such a detector and gaseous filling are disclosed in the U. S. Letters Patent No. 2,512,773, granted June 27, 1950, to Gerhard Herzog and Allen D. Garrison. The gaseous filling is an essential part of a penetrative radiation detector of this kind, and any change or deterioration of the gas filling within the detector housing will cause improper functioning of the detector. Any oxygen which is included accidentally in the gaseous filling of the detector will cause a more or less gradual deterioration of the filling gas, and the detector will then operate improperly and will subsequently be rendered unusable. It has been found that this trouble with oxidation within the detector housing is frequently caused by the improper sealing or closing of the housing after the electrodes have been placed therein. This may take place during the soldering of the cover plate or plates to the side wall of the detector housing, since during this soldering operation air may leak into the interior of the housing at a time when the housing is at an elevated temperature, to produce the unwanted oxidation. It is therefore the principal purpose of this invention to provide a method whereby an end cover plate may be secured to the side walls of the detector housing in such a manner that air or other gases are prevented from entering the housing while the cover plate is being secured thereto.

In carrying out the operation, which will be described more in detail hereinafter, the electrodes are placed within the housing and the cover plate is placed in position at the end of the side walls of the housing. The interior of the housing is then flushed, evacuated and filled with an inert gas, such as argon. The pressure of the argon within the housing is maintained slightly above atmospheric so that some of the argon will continually leak out through the joint between the cover plate and the housing walls, which joint is eventually to be soldered. This overpressure of the argon is maintained while the detector assembly is heated, preferably for two or three hours, to raise the temperature of the metal to the proper value for the soldering operation. The surfaces of the metal to be soldered are then tinned while the overpressure of the argon is still maintained and the overpressure is then relieved, as by connecting the interior of the housing to a flexible resilient container, such as a rubber breathing bag, which preferably already contains some argon. The tinned joint between the cover plate and the walls of the housing are then filled with solder, after which the assembly is permitted to cool. During this cooling period the argon-filled rubber breathing bag remains connected to the detector and maintains an argon supply at zero pressure as the gas within the detector cools and contracts.

The method of this invention is also applicable in cases where the detector housing and the end plate or cap are formed of a metal such as stainless steel, and where the joints between the cap or plate and the housing is to be sealed by inert gas welding. In carrying out this operation, it has been found that tarnishing frequently occurs on the interior of the housing at the location of the welded joint, this tarnishing apparently being produced by the heat of the metal around the joint in the presence of air. It has been found that by maintaining an atmosphere of an inert gas, such, for example, as argon or helium, within the housing to be welded and in the vicinity of the joint between the housing and the cover plate or cap, this tarnishing can be prevented.

Figure 2:
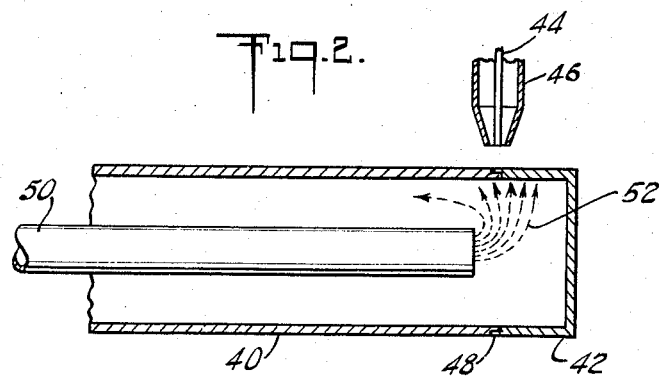

For a better understanding of the invention, reference may be had to the accompanying drawing in which Fig. 1 is a vertical elevation, partly in section, of a radiation detector of which the housing is to be closed and sealed by soldering;

Fig. 2 is a somewhat diagrammatic sectional view through a portion of a tubular detector housing of stainless steel, to which a stainless steel cap or cover plate is to be attached by heliarc welding.

With reference to Fig. 1, a radiation detector housing 10 is shown as comprising side and bottom walls, and an upper cover or closure plate 12 adapted to be soldered to the upper end of the side walls of the housing. It is assumed that the housing 10 and the cover plate 12 are formed of brass or some other suitable metal which lends itself fairly readily to a soldering operation. It is also to be understood that the housing 10 contains the electrodes, such as the cathode and anode of a detector of penetrative radiation of the gas amplification, electrical pulse-producing type. These electrodes are not shown in Fig. 1, since their particular form does not comprise an essential part of the present invention. The cover plate 12 is, however, shown as provided with a suitable insulating member or bushing 14, containing a conductor 16, through which an electrical connection can be made to the anode of the detector. The cover plate 12 is also shown as provided with a length of tubing of copper or the like 18, through which gas may be forced into or out of the housing 10. The periphery of the upper side of the cover plate 12 is shown as provided with a small groove 20, which is adapted to contain the solder necessary to seal the cover plate to the upper end of the housing 10. The cover plate is also shown as resting upon a small shoulder 22 around the inner-upper end of the side walls of the housing. The cover plate 12 is positioned into the housing 10 with a slight press fit. This degree of tightness will insure a minimum of argon gas leaking out during the over-pressure cycle and, further, will maintain the cover plate in the proper position in view of the argon gas overpressure and resulting force on the cover plate. A container or tank 24 of an inert gas, such as argon, is shown as connected to the tubing 18 through a pressure gauge or meter 26 and a valve 28. A flexible resilient container 30, such as a rubber breathing bag, is also adapted to be connected to the tubing 18 through a suitable valve 32. A pipe or tube 34 is also adapted to be connected to the interior of the housing 10 through the tube 18 by means of a valve 36.

In the operation of the method, assuming that the cover plate 12 has been placed in position on the shoulder 22 of the housing 10, the the valves 28 and 32 are closed, and the valve 36 opened. Suitable apparatus, not shown, is connected to the pipe 34, and the interior of the detector housing 10 is evacuated. The valve 36 is then closed and the valve 28 opened so that argon from the tank 24 will pass into the housing through the filler tube 18. This evacuation and filling is repeated a number of times. The final argon filling is maintained within the housing at a pressure slightly above atmospheric, say at about 5 pounds, and while this overpressure is being maintained, the entire detector assembly is heated, preferably for a period of 2 or 3 hours, during which time the temperature of the housing and cover plate are brought up to a proper value for soldering. The surfaces of the upper end of the housing side wall, as well as the surfaces of the small groove 20, are then tinned while this overpressure is still maintained within the housing. While the heating operation is continued, the valve 28 is then closed and the valve 32 opened so as to connect the interior of the housing with the container or breathing bag 30, which preferably already contains some of the same gas as that within the container or tank 24. The pressure within the container for housing 10 will then be reduced to atmospheric, the excess gas passing into the breathing bag 30. The small groove 20 is then filled with solder which melts to make good contact or bond between the cover plate 12 and the upper end of the housing 10. The detector assembly is then permitted to cool with the breathing bag of argon gas connected, and the copper tube 18 may be sealed off so as to prevent air from entering the detector housing. When conducting the soldering operation in this manner, it has been found that no tarnishing or oxidation occurs within the detector housing, and thus, after the housing has been subsequently outgassed, processed and filled with the proper gaseous filling, this filling will be maintained in its proper condition and will not deteriorate.

With reference to the embodiment of Fig. 2, a portion of the side wall of a radiation detector is shown at 40, together with a cap member 42 which is to be placed on the end of the tubular member 40 and to be connected thereto by heliarc welding. In this embodiment the housing 40 and the cap member 42 are formed of a material such as stainless steel, and it is of course well known that it is difficult if not impossible to solder this material with ordinary soft solder. Also, an all welded stainless steel housing forms a superior container under all conditions, especially in cases of high temperatures. It is necessary and/or desirable, therefore, to connect the cap 42 to the housing 40 by means of welding, and such an apparatus is shown diagrammatically by the electrode 44, which may be of tungsten, and the surrounding tubular member 46 through which an inert gas such as argon is directed onto the joint being welded. This joint may be formed as indicated at 48, the peripheries of the housing 40 and the cap 42 being provided with cooperating grooves so as to provide a better joint. A tubular member or pipe 50 is shown as projecting within the housing 40 and the outer end of this member is preferably positioned more or less opposite the joint 48. The pipe 50 is connected to a suitable source or tank of one of the inert gases, preferably helium, and during the welding operation around the exterior of the joint 48, the helium passes upwardly from the open end of the tube, as indicated by the dotted lines and arrows, and provides an atmosphere of helium around the inside of the members 40 and 42 in the vicinity of the joint 48. In this manner air is prevented from contacting the hot inner surface of the metals being welded, and tarnishing and oxidation around the inner surface of the joint thereby prevented.

It is believed the operation will be clear from the foregoing description, but it may be repeated that while argon flows downwardly through the tubular nozzle 46 around the welding rod 44, the housing 40 and the cap 42 are welded around the exterior of the joint 48. During this time the helium indicated at 50 displaces the air from the inner side of the joint 48 and oxidation at this area is thereby prevented. This tarnishing is, of course, an oxidation or a nitrification of a metal such as iron, and this oxidation product or nitride may give off a gas or react with the detector filling gas to poison the gaseous filling, after which the detector would not operate properly. With the method which has been described, this tarnishing is entirely prevented. Although argon or other rare gases may be pumped through the pipe 50, it is preferred to use helium since, because of its extreme lightness, it will pass upwardly into contact with the lower surface of the joint being welded at its upper surface.

Subject matter disclosed in this application, especially the method of closing and sealing a radiation detector through a soldering technique as described and illustrated in connection with Fig. 1, forms the subject matter of divisional application, Serial No. 662,171 filed May 28, 1957.

Obviously, many other modifications and variations of the invention as hereinbefore set forth may be made without departing from the spirit and scope thereof and therefore only such limitations should be imposed as are indicated in the appended claims.

I claim:

1. The method of attaching two tubular members of stainless steel or the like, which comprises placing said members in alignment in a generally horizontal position with their peripheries in contact with each other, rotating said members around their longitudinal axis while welding at a location along the contacting members where the inner and outer surfaces of the joint to be connected are at different elevations while maintaining in an atmosphere of a first inert gas the outer surfaces of the joint to be connected and while maintaining within said members and in the vicinity of said joint an atmosphere of a second inert gas, the one of said gases that is supplied from below the weld-joint being lighter than air and the other of said gases that is supplied from above the weld-joint being heavier than air, thereby to displace oxidizing gases from the vicinity of said weld-joint.

2. The method of claim 1 in which said lighter than air inert gas is helium.

3. The method of welding a joint between two members in an ambient atmosphere of air wherein one side of said joint is at a different elevation from the other side of said joint, which comprises welding the joint between said members while maintaining a flow of a first inert gas that is heavier than air around the upper side of said joint and a second inert gas that is lighter than air around the lower side of said joint so as to exclude air around the joint on both sides thereof during the welding process.

4. The method of claim 3 in which said first gas is argon and said second gas is helium.

5. The method of joining two portions of a housing formed of stainless steel or the like which comprises placing said portions in alignment in order to define a weld joint between the respective portions, positioning a welding electrode outside of the housing opposite the joint to be welded, and welding said two portions together while directing a stream of heavier than air inert gas from above onto the outer surface of the weld joint opposite said electrode and while directing a stream of lighter than air inert gas onto the opposite side of the weld joint from below the joint and within said housing, thereby to displace atmospheric gases from both sides of the weld joint during the welding process.

References Cited in the file of this patent

UNITED STATES PATENTS

| | | |
|---|---|---|
| 1,903,315 | Priebe | Apr. 4, 1933 |
| 2,254,792 | Brown | Sept. 2, 1941 |
| 2,276,847 | Kelley | Mar. 17, 1942 |

(Other references on following page)

UNITED STATES PATENTS

| | | |
|---|---|---|
| 2,280,337 | McKee | Apr. 21, 1942 |
| 2,411,465 | Richardson et al. | Nov. 19, 1946 |
| 2,422,305 | Kopec | June 17, 1947 |
| 2,433,296 | Schaefer | Dec. 23, 1947 |
| 2,438,721 | Spencer | Mar. 30, 1948 |
| 2,476,826 | Conger | July 19, 1949 |
| 2,495,129 | Perrine et al. | Jan. 17, 1950 |
| 2,496,188 | Wiese | Jan. 31, 1950 |
| 2,532,410 | Kennedy | Dec. 5, 1950 |
| 2,591,926 | Gibson et al. | Apr. 8, 1952 |
| 2,630,513 | Redmond | Mar. 3, 1953 |
| 2,644,070 | Herbst | June 30, 1953 |
| 2,654,822 | Agule | Oct. 6, 1953 |
| 2,760,044 | Mott | Aug. 21, 1956 |